United States Patent
Kim et al.

(10) Patent No.: US 9,392,148 B2
(45) Date of Patent: Jul. 12, 2016

(54) DISPLAY DEVICE INCLUDING CAMERA MODULE

(71) Applicant: LG ELECTRONICS INC., Seoul (KR)

(72) Inventors: Youngsung Kim, Seoul (KR); Sungtae Lee, Seoul (KR); Keunbok Song, Seoul (KR); Dukho Cho, Seoul (KR); JongJin Woo, Seoul (KR); Sangdon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 14/133,227

(22) Filed: Dec. 18, 2013

(65) Prior Publication Data

US 2014/0218602 A1 Aug. 7, 2014

(30) Foreign Application Priority Data

Feb. 1, 2013 (KR) .................. 10-2013-0011694
Feb. 1, 2013 (KR) .................. 10-2013-0011695

(51) Int. Cl.
*H04N 5/225* (2006.01)
*G06F 1/16* (2006.01)

(52) U.S. Cl.
CPC ............ *H04N 5/2252* (2013.01); *G06F 1/1605* (2013.01)

(58) Field of Classification Search
CPC .................................................. H04N 5/2253
USPC .......................................................... 348/373
See application file for complete search history.

(56) References Cited

U.S. PATENT DOCUMENTS

| | | | |
|---|---|---|---|
| 6,417,884 B1 * | 7/2002 | Chang et al. .............. | 348/373 |
| 7,256,987 B2 * | 8/2007 | Weng ..................... | 361/679.55 |
| 8,203,646 B2 * | 6/2012 | Fan ......................... | 348/373 |
| 8,610,822 B2 * | 12/2013 | Weber et al. .............. | 348/374 |
| 8,866,989 B2 * | 10/2014 | Mathew et al. ............ | 349/58 |
| 2011/0261283 A1 * | 10/2011 | Kim ....................... | G03B 17/02 349/58 |
| 2012/0206669 A1 * | 8/2012 | Kim et al. ................ | 349/58 |
| 2013/0016267 A1 * | 1/2013 | Ko et al. .................. | 348/333.01 |
| 2014/0063302 A1 * | 3/2014 | Shukla ................... | H04N 5/2254 348/294 |
| 2014/0063407 A1 * | 3/2014 | Kwon et al. .............. | 349/58 |

* cited by examiner

*Primary Examiner* — Gary C Vieaux
(74) *Attorney, Agent, or Firm* — Birch, Stewart, Kolasch & Birch, LLP

(57) ABSTRACT

A display device including a camera module; a display panel; and a side cover part covering at least a portion of a side of the display panel and including a camera module cut-out receiving portion for coupling the camera module to the side cover part such that the coupled camera module does not protrude to an outside of the side cover part.

17 Claims, 10 Drawing Sheets

(a)

(b)

DISPLAY DEVICE INCLUDING CAMERA MODULE

CROSS-REFERENCE TO RELATED APPLICATIONS

The present application claims priority under 35 U.S.C. §119 and 35 U.S.C. §365 to Korean Patent Application No. 10-2013-0011694 filed on Feb. 1, 2013 and 10-2013-0011695 filed on Feb. 1, 2013, which are hereby incorporated by reference in their entirety.

BACKGROUND OF THE INVENTION

1. Field of the Invention

The present invention relates to a display device including a camera module. In particular, the display device outputs a received image signal on a screen. The display device includes all devices displaying an image input such as a monitor displaying an image received from a computer and a TV displaying audio and video transmitted from a broadcasting station.

2. Discussion of the Related Art

A related art display device has a main function for displaying an image on a display panel, but recently has various additional functions. For example, a display device may include a camera to allow video calls or may provide various functions based on information obtained by capturing an image through the camera.

However, when a display device includes a camera, the camera is installed to be protruded outward from the display panel to be seen from the user's position, or is installed behind the display panel. Therefore, the design of the display device is less elegant and the size of the display panel is thicker.

SUMMARY OF THE INVENTION

Embodiments provide a display device including a camera module that does not protrude toward the outside thereof to achieve a better appearance and does not increase the thickness thereof.

In one embodiment, a display device including a camera module includes: a display module including a display panel; a side cover part covering at least a portion of a side of the display module; and the camera module coupled to the side cover part, wherein the side cover part includes a camera module receiving part having a portion cut and the camera module includes a case and a lens in the case and is coupled to the camera module receiving part.

In another embodiment, a display device including a camera module includes: a display panel; a backlight unit assembly disposed at a bottom of the display panel and providing light to the display panel; a side cover part covering at least a portion of a side part of the backlight unit assembly; and the camera module coupled to the side cover part, wherein as seen from the top of the display panel, the camera module does not protrude toward an outside of the display panel.

In further another embodiment, a display device includes: a display panel; and a camera module disposed at a bottom of the display panel, wherein as seen from the top of the display panel, the camera module does not protrude toward an outside of the display panel.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Reference will now be made in detail to the embodiments of the present invention, examples of which are illustrated in the accompanying drawings. Hereinafter, a configuration of a display device according to an embodiment of the present invention will be described in more detail with reference to the drawings.

Figure 1:
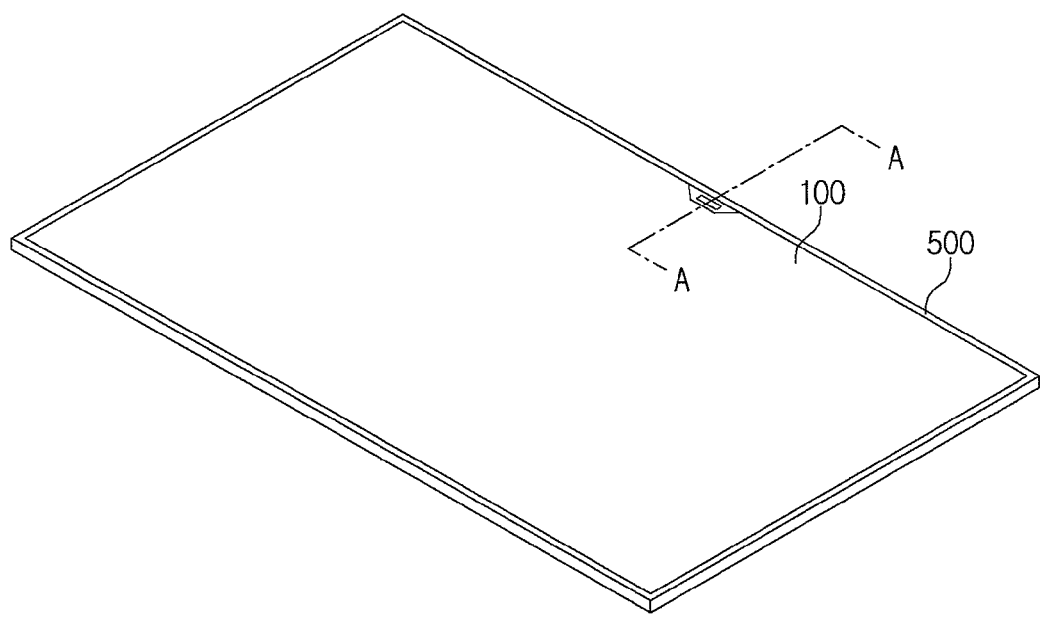
FIG. 1 is a perspective view illustrating a display device including a camera module according to an embodiment of the present invention.
Figure 2:
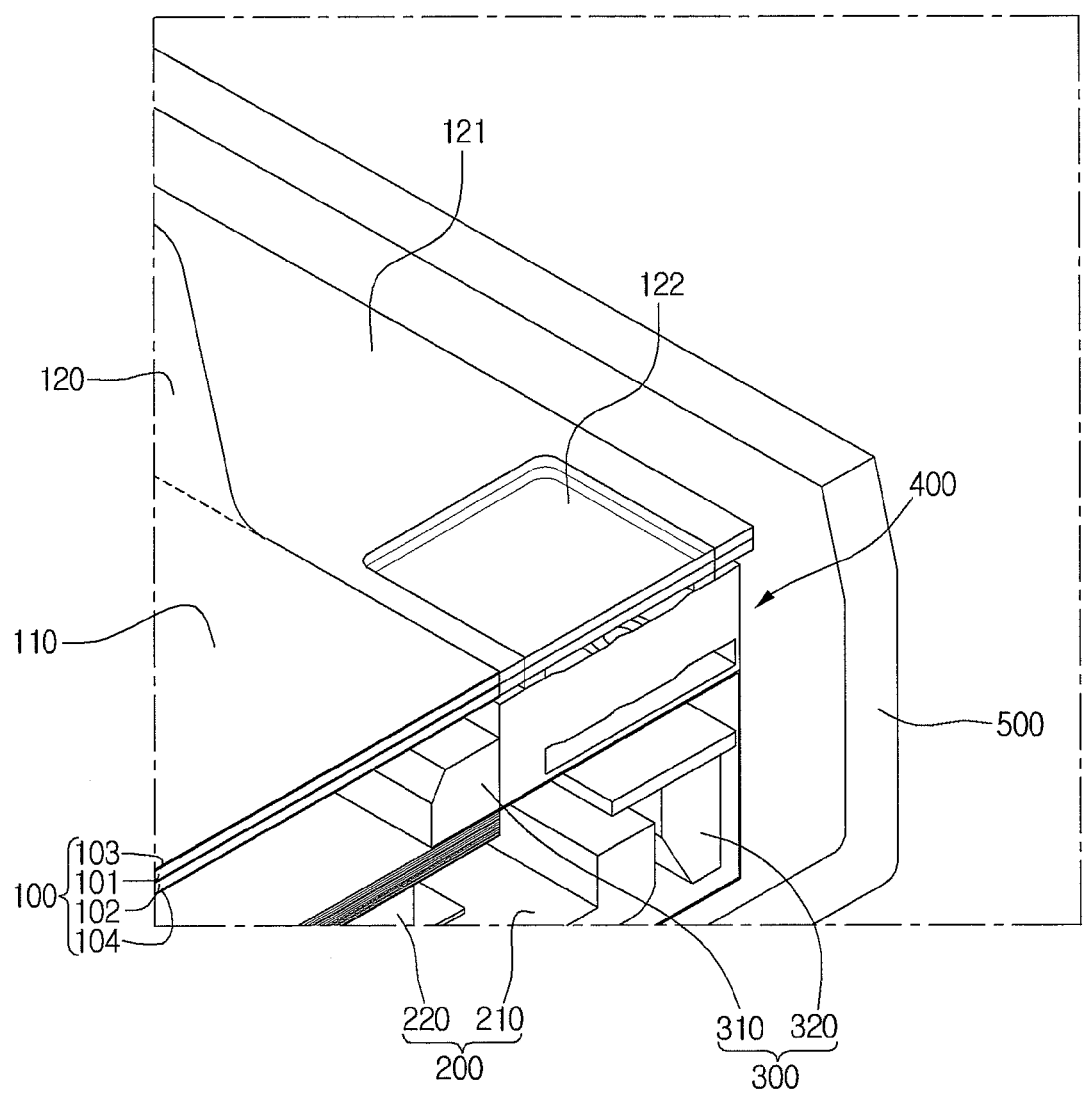
FIG. 2 is a cross-section view taken along the line A-A of FIG. 1.

As shown in FIG. 1, the display device according to an embodiment of the present invention includes a display panel 100 and an external case or cover 500. As shown in FIG. 2, the display device includes a backlight unit assembly 200 providing light to the display panel 100.

Figure 10:
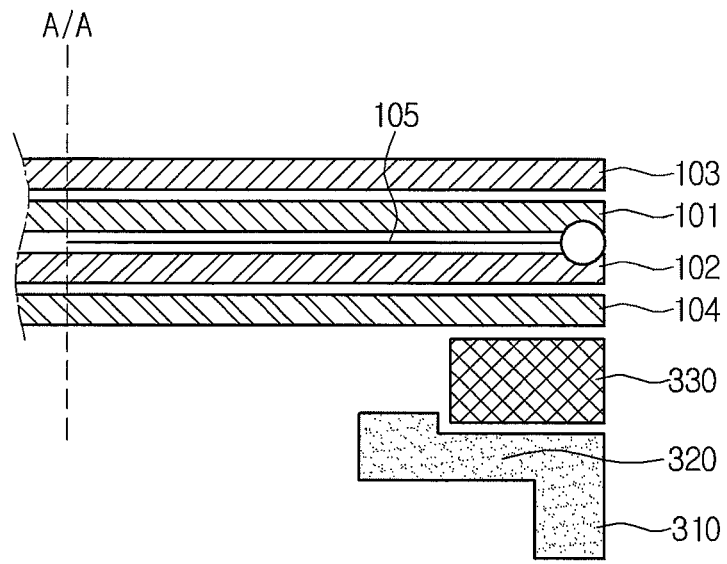
FIG. 10(a) is a cross-sectional view showing when a camera module is not installed at a display device.
FIG. 10(b) is a cross-sectional view showing when a camera module is installed at a display device.
Figure 10:
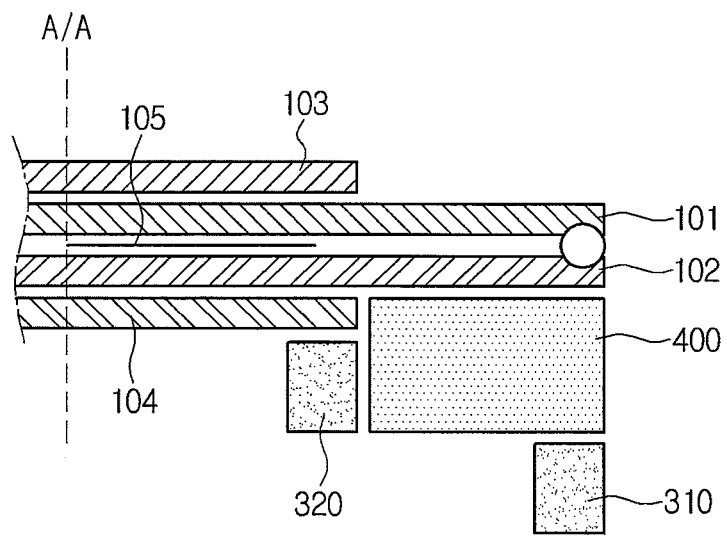

In addition, the display panel 100 may be a liquid crystal panel including an upper substrate 101, a lower substrate 102, an upper polarizing plate 103, and a lower polarizing plate 104. Referring to FIGS. 2 and 10, the display panel 100 includes the upper substrate 101 and the lower substrate 102 facing each other and maintaining a uniform cell gap. Further, a liquid crystal layer may be formed between the upper substrate 101 and the lower substrate 102.

For reference, as shown in FIG. 10, a portion of each component constituting the display panel 100 is exaggerated in order to describe a configuration of the display panel 100. Accordingly, some configurations, which are difficult to show in FIG. 2, are shown in FIG. 10.

Further, a color filter is disposed on the upper substrate 101 to realize red (R), green (G), and blue (B) colors. The color filter may include a plurality of pixels including R, G, and B sub-pixels and generates an image corresponding to R, G, or B color when light is applied.

A predetermined transistor for turning on/off liquid crystal by each pixel, for example, a thin film transistor (TFT), may be formed on the lower substrate 102. Accordingly, the upper substrate 101 may be referred to as a color filter substrate, and the lower substrate 102 may be referred to as a TFT substrate.

Additionally, an upper optical layer such as the upper polarization film 103 may be disposed on the top of the upper substrate 101, and a lower optical layer such as the lower polarization film 104 may be disposed on the bottom of the lower substrate 102.

The upper polarization film 103 polarizes light passing through the display panel 100 and the lower polarization film 104 polarizes light emitted from a backlight unit assembly 200 described later.

In addition, referring to FIG. 2, the display panel 100 is divided into a display area 110 for displaying an actual image and a non-display area 120 for displaying no image. Here, the non-display area 120 is formed along the edge of the display panel 100, and a light shielding layer 105 is provided in the non-display area 120 as shown in FIG. 10. The light shielding layer 105 includes a layer having light screening performance and is referred to as a black matrix. The light shielding layer 105 may be provided between the upper substrate 101 and the lower substrate 102.

Further, as shown in FIG. 2, the display panel 100 includes a first area 121 on the top of a portion where a camera module 400 described later is installed and a second area 122 at the middle of the first area 121. In more detail, the first area 121 is formed at a position corresponding to the camera module 400 in the non-display area 120, and the second area 122 is formed at a position corresponding to a lens 420 (FIGS. 7 and 8) of the camera module 400 in the middle of the first area 121.

The first area 121 is formed by removing the upper polarization layer 103 and the lower polarization layer 104 from the non-display area 120. Accordingly, the non-display area 120 includes the upper substrate 101, the lower substrate 102, and the light shielding layer 105.

In addition, the second area 122 is formed by removing the light shielding layer 105 from the central portion of the first area 121. That is, the second area 122 is an area where the black matrix, i.e., the light shielding layer 105, is removed from the first area 121. Accordingly, the second area 122 includes the upper substrate 101 and the lower substrate 102.

In addition, the second area 122 is formed at a portion corresponding to the lens 420 of the camera module 400 so as to prevent light transmission blocking due to the light shielding layer 105 while an image is captured.

Further, the backlight unit assembly 200 is provided at the bottom of the display panel 100. The backlight unit assembly 200 includes a bottom cover 240 (FIG. 5), a circuit substrate disposed on a top surface of the bottom cover 240, a light source mounted on the circuit substrate, and a backlight unit 220 for converting a light from the light source into a surface light source and providing it to the display panel 100.

The backlight unit 220 includes a light guide plate and a plurality of optical sheets. The backlight unit 220 for converting a point light source into a surface light source, including the light guide plate and the plurality of optical sheets, may include a related art back light unit.

Moreover, although a display module including the liquid crystal display (LCD) panel and the backlight is used as a display module according to this embodiment, the present invention is not limited thereto. For example, the display module may include a Plasma Display Panel (PDP) display module, an Electro Luminescent Display (ELD) module, a Vacuum Fluorescent Display (VFD) module, and an Organic Light Emitting Diodes (OLED) display module.

Figure 4:
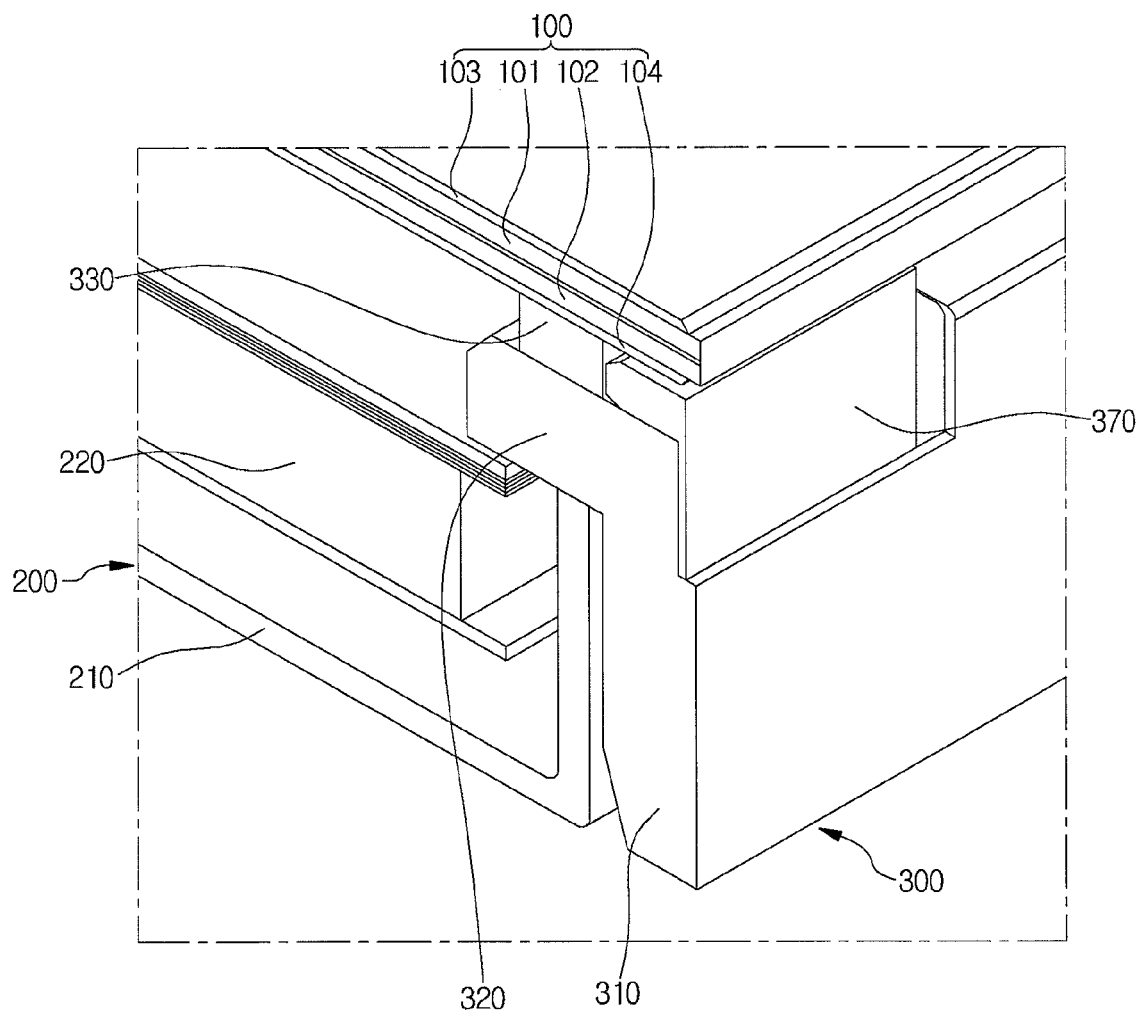
FIG. 4 is a cross-section view taken along the line B-B of FIG. 3.
Figure 6:
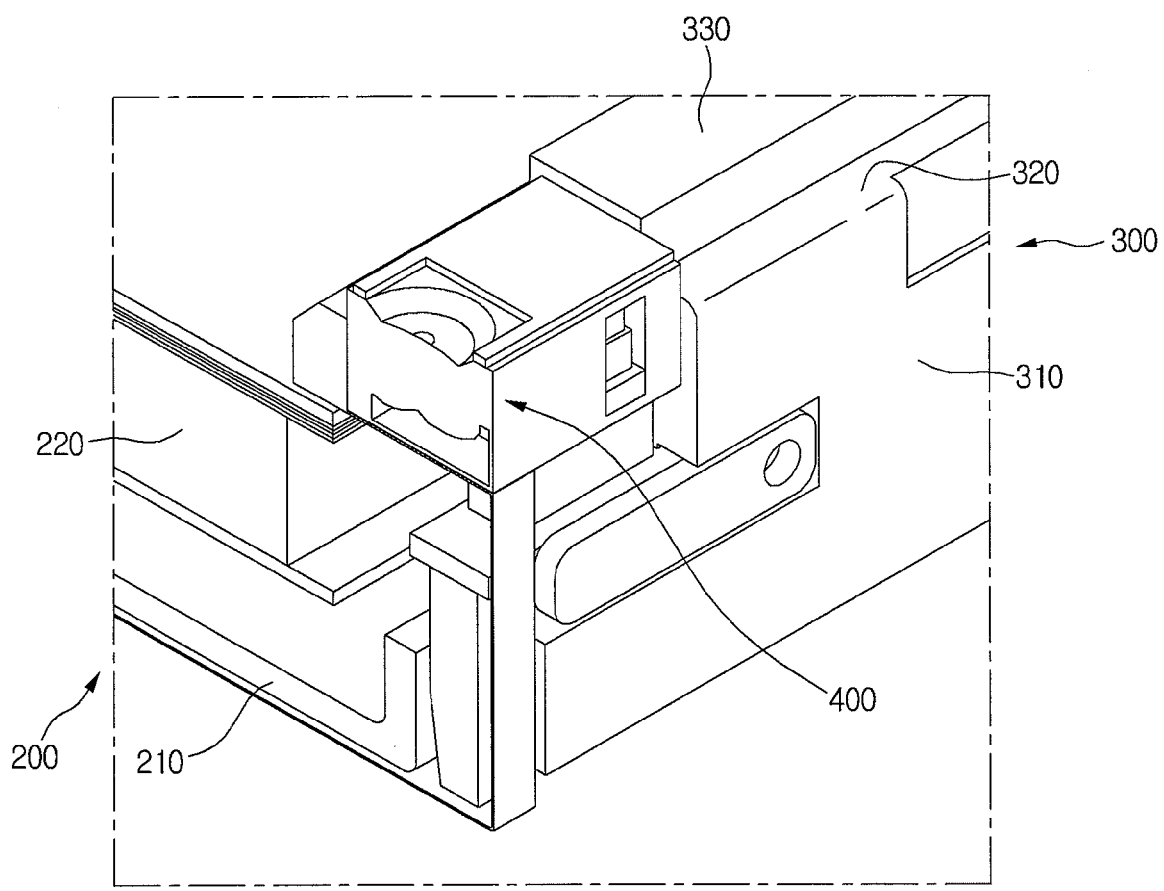
FIG. 6 is a cross-sectional view taken along the line of C-C of FIG. 5.

In addition, as shown in FIGS. 2, 4 and 6, a side cover part 300 is disposed at a side of the display panel 100 and backlight unit assembly 200. The side cover part 300 extends along at least a portion of the side of the display panel 100 and backlight unit assembly 200, and covers the side of the display panel 100 and backlight unit assembly 200.

In more detail, the side cover part 300 is disposed at the side of the backlight unit assembly 200, extends along at least a portion of the side of the backlight unit assembly 200, and covers the side of the backlight unit assembly 200. Also, the display panel 100 is coupled to the top of the side cover part 300.

As shown in FIGS. 2, 4, 6 and 9, the side cover part 300 includes a side part 310 extending to surround at least a portion of the side of the display panel 100 and a top part 320 extending toward the inside at the top end of the side part 310. Also, the backside edge of the display panel 100 is coupled to the top of the top part 320.

Figure 8:
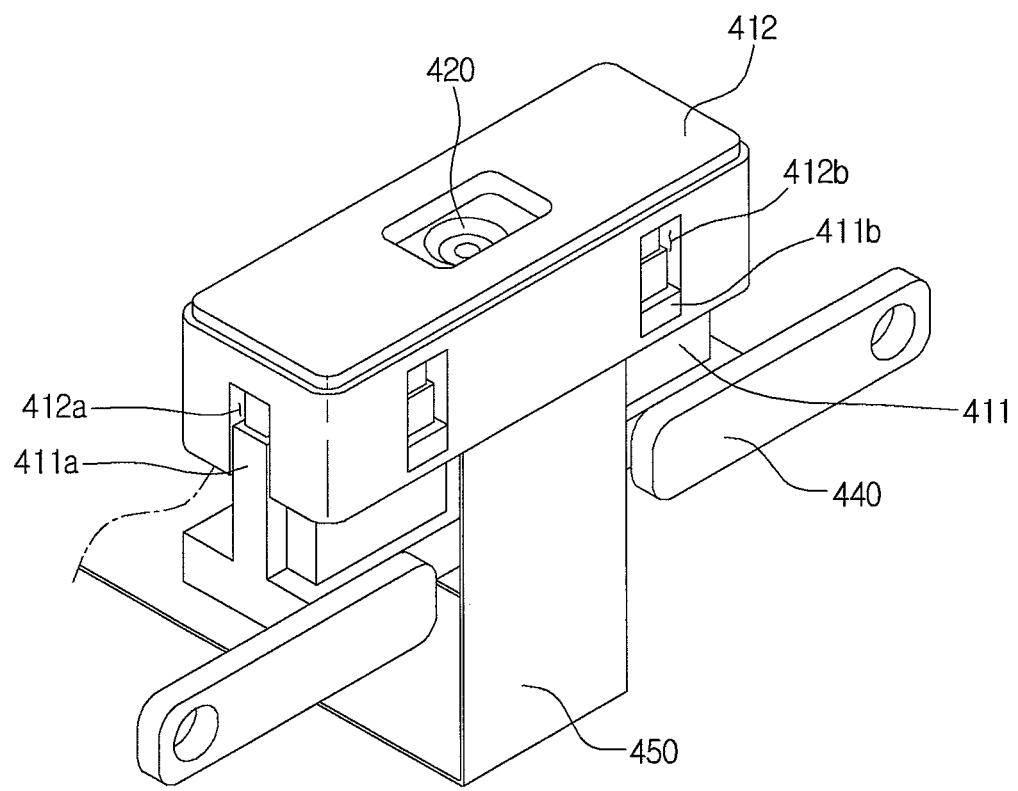
Figure 9:
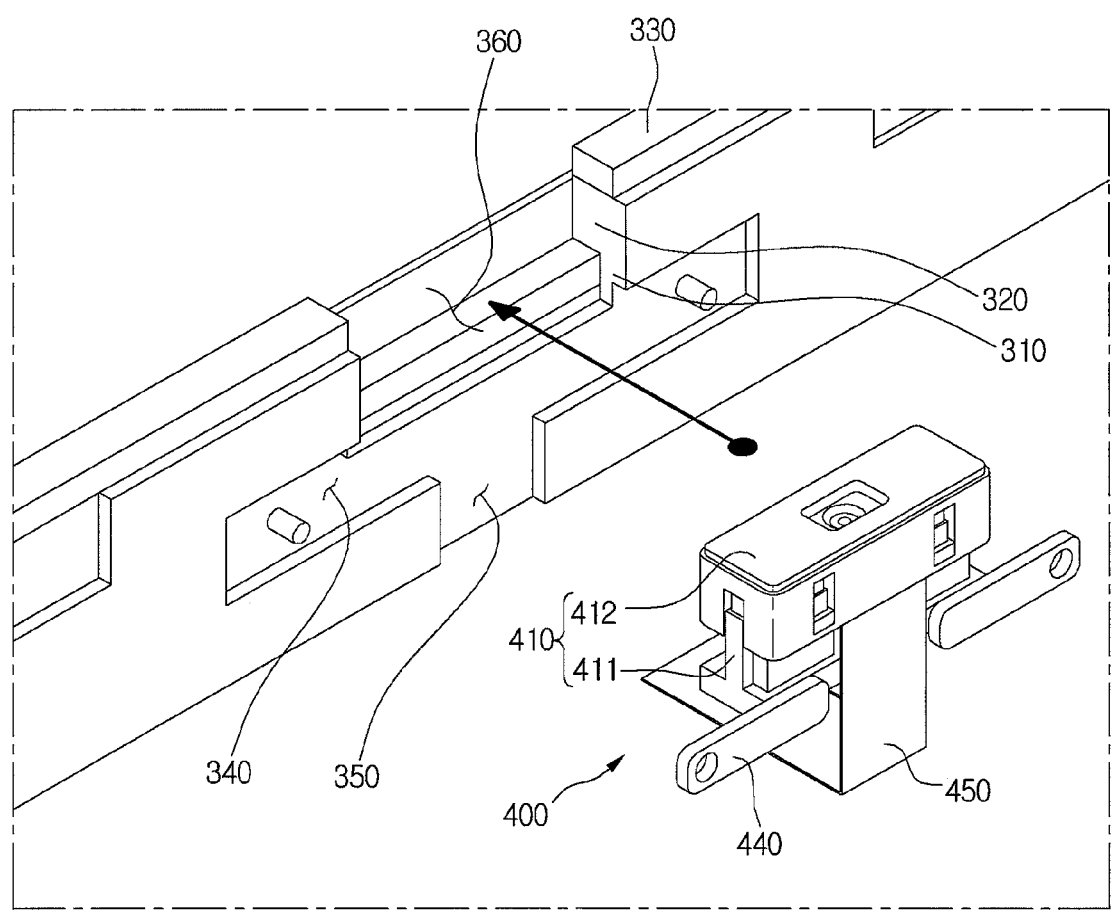
FIG. 9 is a view showing when a camera module is coupled to a side cover part.

As shown in FIGS. 6, 8 and 9, an elastic pad 330 may be provided on the top of the top part 320 of the side cover part 300. The elastic pad 330 is disposed between the display panel 100 and the top part 320 of the side cover part 300 and serves for sealing maintenance and shock absorption.

The side cover part 300 includes a camera module receiving part 360 as shown in FIG. 9 for receiving the camera module 400. The camera module receiving part 360 is formed by cutting off a portion of the side cover part 300. In more detail, the camera module receiving part 360 may be formed by cutting a portion of the side part 310 and a portion of the top part 320 of the side cover part 300.

A fixing part coupling part 340 is provided below the camera module receiving part 360 as shown in FIG. 9. The fixing part coupling part 340 has a groove form stepped toward the inside. The fixing part coupling part 340 is a portion to which a fixing part 440 of the camera module 400 is coupled, and has a form corresponding to the fixing part 440.

In addition, the stepped depth of the fixing part coupling part 340 may be equal to or greater than the thickness of the fixing part 440. This is to prevent the fixing part 400, i.e., a part of the camera module 400, from protruding toward the outside of the side cover part 300. The coupling part 340 is also more elongated from side to side than the camera module receiving part 360, and thus firmly fixes the camera module 400 to the side cover part 300.

As shown in FIG. 9, the side cover part 300 includes a flexible printed circuit board (FPCB) receiving part 350 extending from the camera module receiving part 360 toward the bottom. The FPCB receiving part 350 has a groove form stepped toward the inside, and extends from the fixing part coupling part 340 toward the bottom, and is a portion where an FPCB is seated.

Figure 3:
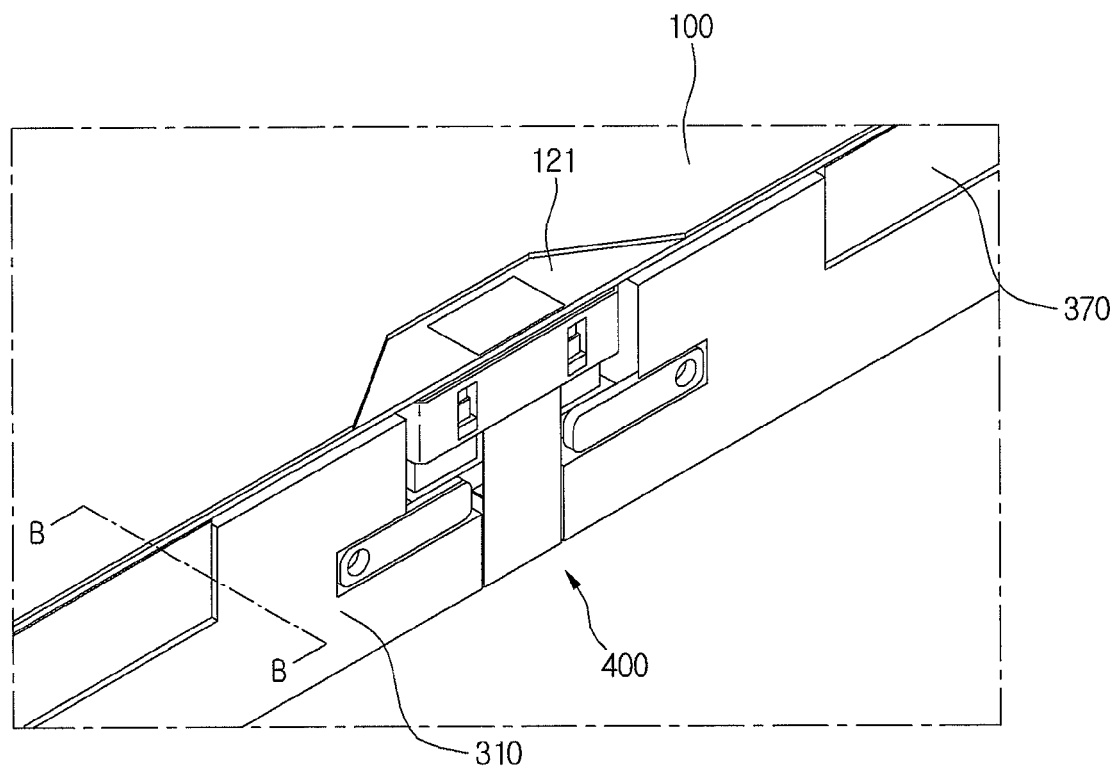
FIG. 3 is a perspective view showing when a bottom cover is removed from a display device according to an embodiment of the present invention.
Figure 5:
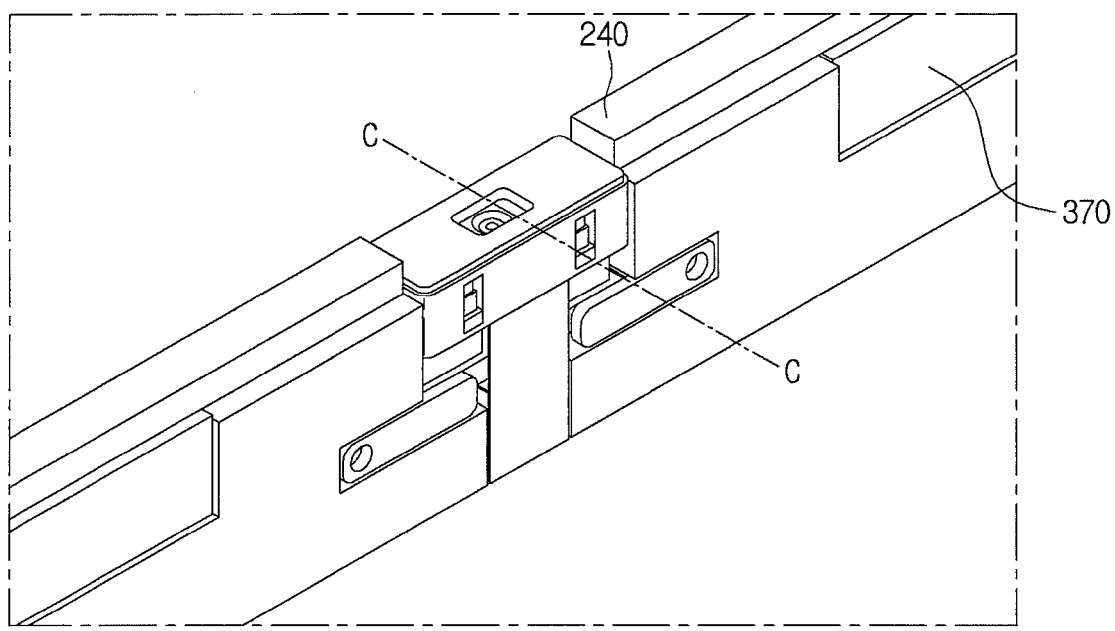
FIG. 5 is a view showing when a display panel is removed from FIG. 3.

In addition, as shown in FIGS. 3-5, a plate-shaped enhancement part 370 formed of a material having a greater stiffness at both sides of the camera module receiving part 360 is coupled to the side cover part 300, so as to protect the camera module 400 from external forces in a vertical direction and prevent the display panel 100 from moving vertically.

Hereinafter, a configuration of the camera module 400 coupled to the camera module receiving part 360 will be described with respect to FIGS. 7-9.

As shown, the camera module 400 includes a case 410, a lens 420 at the inside of the case 410, and a buffer member 430. The case 410 includes a lower case 411 and an upper case 412 coupled to the top of the lower case 411.

Guide protrusions 411a vertically extending are provided at both ends of the lower case 411 in a left-to-right direction, and insertable guide grooves 412a into which the guide protrusions 411a are insertable are provided at both ends of the upper case 412 in a left-to-right direction. The guide groove 412a is elongated vertically. Further, the top of the guide protrusion 411a is spaced a predetermined distance apart from the end of the guide groove 412a.

Due to such a gap, as external force is applied to the upper case 411 downwardly, while the buffer member 430 absorbs the shock, the upper case 412 can downwardly move relatively with respect to the lower case 411.

Further, in this embodiment, although the lower case 411 including the guide protrusion 411a and the upper case 412 including the guide groove 412a are described as one example, a guide protrusion may be provided at the upper case 412 and a guide groove provided at the lower case 411.

As shown in FIG. 8, the lower case 411 includes a hook protrusion 411b and the upper case 412 includes a hook groove 412b into which the hook protrusion 411b is insertable. In addition, the vertical length of the hook groove 412b is greater than that of the hook protrusion 411b. When no external power is applied, the bottom of the hook protrusion 411b contacts the bottom of the hook groove 412b.

Because the buffer member 430 is disposed between the upper case 412 and the lower case 411 and applies pressure to the upper case 412 upwardly and the lower case 411 downwardly, the hook protrusion 411b prevents the upper case 412 from separating from the lower case 411 in the hook groove 412b.

Moreover, when an external force is applied to the upper case 412, because the upper case 412 can relatively move toward the lower case 411, by making the vertical length of the hook groove 412b greater than the vertical length of the hook protrusion 411b, the hook protrusion 411b can relatively move in the hook groove 412b.

Figure 7:
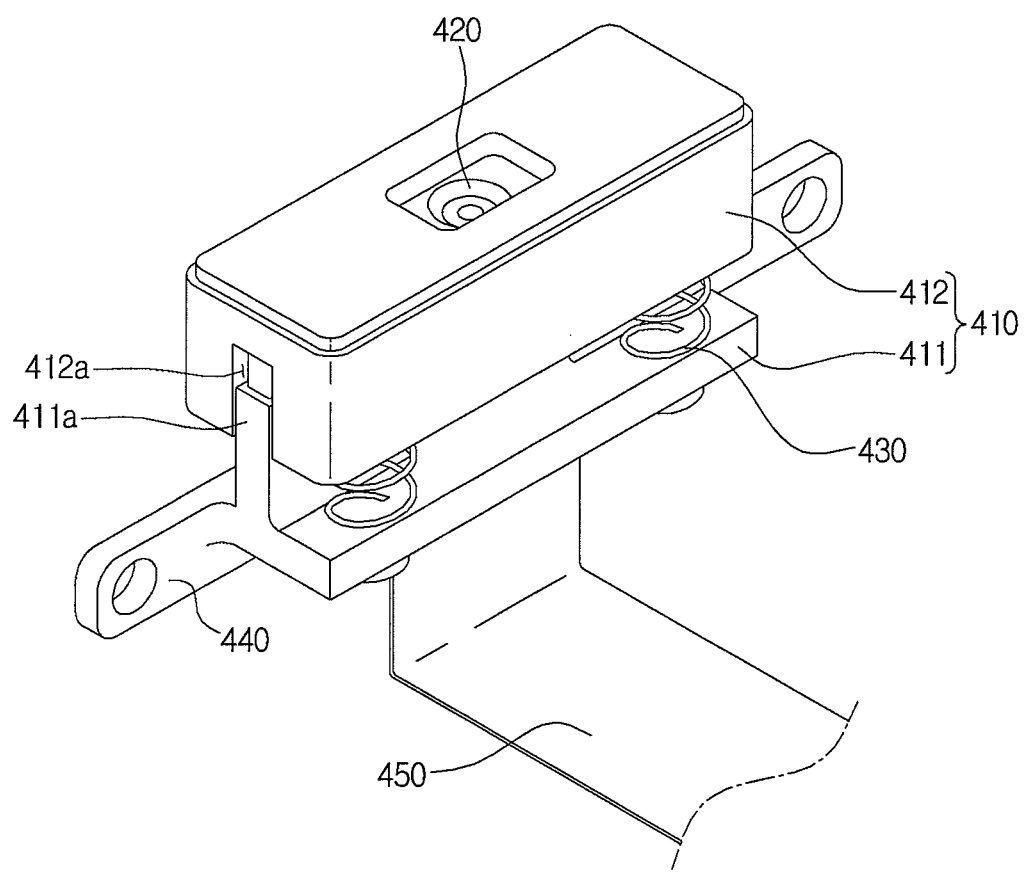
FIGS. 7 and 8 are perspective views of a camera module.

As shown in FIGS. 7-9, a fixing part 440 for coupling to the side cover part 300 is provided at the outside of the lower case 410. The fixing part 440 protrudes and extends downwardly and extends toward the outside in a left-to-right direction. The fixing part 440 may have a roughly plate form having a predetermined thickness, and may be integrally formed with the lower case 411.

As shown in FIG. 7, the lens 420 and the buffer member 430 are provided between the upper case 412 and the lower case 411. As shown in FIG. 8, the lens 420 is disposed at the central portion in a left-to-right direction between the upper case 412 and the lower case 411.

Also, the upper case 412 includes a transparent part provided at a portion corresponding to the lens 420. The transparent part may be formed by cutting a portion of the upper case 412 or may be formed of a transparent material. This allows light to be incident to the lens 420.

As shown in FIG. 7, the buffer members 430 are disposed at the left and right of the lens 420. The buffer member 430 has one end supported by the upper case 412 and the other end supported by the lower case 411. In addition, the buffer member 430 may be fixed at each of the upper case 412 and the lower case 411, and may be fixed at one of the upper case 412 and the lower case 411.

Further, the buffer member 430 absorbs and alleviates the impact applied to the upper case 412 downwardly. For example, the buffer member 430 may be a coil spring that extends in a vertical direction.

Accordingly, when a force is downwardly applied to the camera module 400, the upper case 412 moves downwardly by a gap between the guide protrusion 411a and the guide grove 412a or a gap between the hook protrusion 411b and the hook groove 412b and absorbs impact. That is, the buffer member 430 is elastically deformed to absorb impact.

Moreover, the camera module 400 may further include a sensor unit for sensing a light passing through the lens and converting the sensed light into an electrical signal. The sensor unit may include a sensing chip for converting light into an electrical signal, and a circuit substrate receiving an electrical signal applied from the sensing chip.

Also, as shown in FIGS. 7-9, the circuit substrate may be connected to a FPCB 450. That is, the FPCB 450 may connect a circuit substrate of a camera module to a main control module of a display device.

Moreover, as mentioned above and as shown in FIGS. 2 and 3, the display panel 100 is disposed on the top of the camera module 400, and the first area 121 is disposed at a position corresponding to the camera module 400, and the second area 122 is disposed at a position corresponding to the transparent part or lens 420 of the camera module 400.

That is, the first area 121 is disposed on the top of the camera module 400 and the transparent part and the second area 122 is disposed on the top of the lens 420. In addition, the top of the camera module 400 contacts the bottom of the display panel 100 without a bonding material therebetween.

Accordingly, when a left-to-right direction force is applied to the display panel 100, the camera module 400 may be damaged according thereto, or a coupling state may be poor. Thus, the camera module 400 may be spaced apart from the display panel 100 without contact.

Moreover, a display device including a camera module according to an embodiment of the present invention may further include an external case 500 as shown in FIGS. 1 and 2. The external case 500 covers the bottom and side part of the display panel 100 and backlight unit assembly 200 and the side cover part 300. Accordingly, the display panel 100 and backlight unit assembly 200 and the side cover part 300 are received in the external case 500. The external case 500 also protects the back light unit assembly 200 from shock and pressure applied from the outside.

Hereinafter, in relation to the display device including a camera module with the above configuration, a coupling process of the camera module 400 will be described.

While the side cover part 300 is coupled to the outside of the backlight unit assembly 200, after the camera module 400 is positioned at the side of the camera module receiving part 360 formed at the side cover part 300, by sliding the camera module 400 toward the side cover part 300 in a lateral direction, the camera module 400 is seated in the camera module receiving part 360 (see FIGS. 3 and 9).

At this point, the fixing part 440 is seated on the fixing part coupling part 340, and the FPCB 450 is seated on the FPCB receiving part 350. In addition, the fixing part 440 and the fixing part coupling part 340 may be chemically fixed to each other by an adhesive material, and may be mechanically fixed to each other by a bolt or other fastenings.

When this coupling is completed, the fixing part 440 does not protrude toward the outside of the side part 310 of the side cover part 300, and in more detail, the entire camera module 400 does not protrude toward the outside of the side part 310 of the side cover part 300 (see FIGS. 3 and 6). Additionally, the entire camera module 400 does not protrude toward the top of the top part 320.

Once the coupling of the camera module 400 is completed, the display panel 100 is coupled to the top of the side cover part 300 and the camera module 400. In particular, the display panel 100 is attached to the top part 320 of the side cover part 300. When an elastic pad 330 (FIGS. 6 and 9) is provided on the top of the top part 320, the display panel 100 can be attached to the top of the elastic pad 330.

In addition, the display panel 100 is fixed to the elastic pad 330, but is not fixed to the camera module 400. That is, the display panel 100 and the elastic pad 330 simply contact each other, or may be spaced a predetermined distance apart from each other.

Accordingly, when an external force is applied to the display panel 100 in a left-to-right direction, even if the display panel 100 moves a little in a left-to-right direction, the external force is not transmitted to the camera module 400.

Further, the repair and part replacement of the camera module 400 are easy. For example, because the camera module 400 is not attached or fixed to the display panel 100 through an adhesive, the camera module 400 may be easily replaced and repaired without the damage of the display panel 100.

Moreover, besides the above method, the display panel 100 may be first coupled to the side cover part 300, and then may be coupled to the side cover part 300 by sliding the camera module 400 from the side.

In this instance, without separating the display panel 100 from the side cover part 300 and the backlight unit assembly 200, the camera module 400 is separated so that its repair and replacement are possible.

In addition, according to the above structure, when a downward impact is applied to the display panel 100, the elastic pad 330 absorbs the applied impact primarily and then the buffer member 430 in the camera module 400 absorbs the applied impact secondly, so that the camera module 400 is not damaged.

Additionally, as mentioned above, because the camera module 400 is coupled to a cut portion of the side cover part 300 covering the sides of the display panel 100 and the backlight unit assembly 200, and also does not protrude toward the outside of the side part 310 and top part 320 of the side cover part 300, without increasing the volume of a display device, the coupling of the camera module 400 is achieved.

Although embodiments have been described with reference to a number of illustrative embodiments thereof, numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a camera module including a lens;
a display panel; and
a side cover part covering at least a portion of a side of the display panel and including a camera module receiving portion for coupling the camera module to the side cover part,
wherein the display panel covers the camera module in which a front surface of the camera module faces a back surface of the display panel such that light is incident to the lens of the camera module through the display panel,
wherein the camera module includes a buffer member absorbing an external force applied in a direction of the incident light,
wherein the camera module further includes an upper case and a lower case,
wherein the upper case includes a transparent part disposed at a position corresponding to the lens,
wherein the buffer member is disposed between the upper case and the lower case,
wherein one of the upper case and the lower case includes a guide protrusion extending in a direction of the incident light, and
wherein the other of the upper case and the lower case includes a guide groove where the guide protrusion is inserted and slidable after engagement of the upper case and the lower case such that the guide groove is configured to restrict the slidable direction of the guide protrusion.

2. The display device according to claim 1, wherein the camera module receiving portion includes a cut-out top portion of the side cover part.

3. The display device according to claim 1, wherein the display panel comprises a substrate and optical layers coupled to a top and bottom of the substrate, and
wherein a portion of the optical layers corresponding to the lens of camera module is removed.

4. The display device according to claim 3, wherein the display panel further comprises a light shielding layer screening light, and
wherein a portion of the light shielding layer corresponding to the lens of the camera module is removed.

5. The display device according to claim 1, wherein as seen from the direction of the incident light, an outer side of the side cover part is positioned out more than an outer side of the camera module.

6. The display device according to claim 5, wherein the side cover part comprises a side part extending to surround at least a portion of a side part of the display panel and a top part extending toward an inside at a top of the side part, and
wherein the camera module receiving portion includes a partial cut-out or full cut-out of the side part and a part or all of the top part.

7. The display device according to claim 6, further comprising:
a plate shaped fixing part protruding toward an outside in a left-to-right direction or protruding downwardly provided at a case of the camera module, and a stepped coupling part having a same thickness as the fixing part or having a less height than the fixing part at the side part of the display panel, thereby coupling the fixing part to the coupling part.

8. The display device according to claim 6, wherein the camera module further comprises a flexible printed circuit board (FPCB), and
wherein the side part of the side cover part further includes a stepped portion where the FPCB is positioned.

9. The display device according to claim 1, wherein an end part of the guide protrusion is spaced apart from an inner end part of the guide groove when no external force is applied.

10. The display device according to claim 1, wherein one of the upper case and the lower case includes a hook protrusion,
wherein the other of the upper case and the lower case includes a hook groove where the hook protrusion is inserted,
wherein a vertical direction length of the hook groove is greater than a vertical direction length of the hook protrusion such that the hook groove is configured to restrict the slidable direction of the hook protrusion, and
wherein the vertical direction corresponds to a direction of the incident light.

11. The display device according to claim 1, wherein the buffer member is elastic.

12. The display device according to claim 1, wherein the buffer member is a spring.

13. A display device, comprising:
a camera module;
a display panel;
a backlight unit assembly disposed at a bottom of the display panel and providing light to the display panel; and
a side cover part covering at least a portion of a side part of the backlight unit assembly,
wherein the camera module is fixed to the side cover part as one body,
wherein as seen from the top of the display panel, the camera module does not protrude to an outside of the display panel,
wherein the display panel is fixed at a top of the side cover part, and
wherein a top of the camera module and a bottom of the display panel are not fixedly coupled such that the camera module is configured to be slidable along a facing surface of the display panel without contacting the display panel.

14. The display device according to claim 13, wherein the display panel comprises:
an upper substrate and a lower substrate;
an upper polarizing plate disposed on a top of the upper substrate; and
a lower polarizing plate disposed on a bottom of the lower substrate, and
wherein a portion of the upper polarizing plate and the lower polarizing plate corresponding to a lens of the camera module is removed.

15. The display device according to claim 14, further comprising:
a light shielding layer between the upper substrate and the lower substrate,
wherein a portion of the light shielding layer corresponding to a lens of the camera module is removed.

16. The display device according to claim 13, wherein the side cover part includes a camera module receiving portion for coupling the camera module to the side cover part such that the coupled camera module does not protrude to an outside of the side cover part.

17. The display device according to claim 13, wherein the display panel covers the camera module in which a front surface of the camera module faces a back surface of the display panel such that light is incident to the lens of the camera module through the display panel.

* * * * *